United States Patent [19]

Eidelman

[11] Patent Number: 5,255,164
[45] Date of Patent: Oct. 19, 1993

[54] SAFETY LIGHT MARKER SYSTEM FOR MOTOR VEHICLES

[75] Inventor: Gabriel Eidelman, 11705 Dinwiddie Dr., Rockville, Md. 20852

[73] Assignee: Gabriel Eidelman, Rockville, Md.

[21] Appl. No.: 835,493

[22] Filed: Feb. 14, 1992

[51] Int. Cl.⁵ ............................................. B60Q 1/26
[52] U.S. Cl. ........................................ 362/80; 362/74; 340/475
[58] Field of Search ............... 362/61, 80, 83.3, 83, 362/806, 219, 73, 74; 340/475, 465, 478; 40/592, 590

[56] References Cited

U.S. PATENT DOCUMENTS

| | | | |
|---|---|---|---|
| 1,866,802 | 7/1932 | Gragg et al. | 362/80 |
| 2,086,524 | 7/1937 | Clark | 362/80 |
| 2,270,377 | 1/1942 | McLauchlin | 40/592 |
| 4,607,317 | 8/1986 | Lin | 362/219 |
| 4,745,525 | 5/1988 | Sheehy | 362/32 |
| 4,800,470 | 1/1989 | Hartsaw | 362/73 |
| 4,811,172 | 3/1989 | Davenport et al. | 362/80 |
| 4,947,293 | 8/1990 | Johnson et al. | 362/61 |
| 5,053,930 | 10/1991 | Benavides | 362/80 |
| 5,072,340 | 12/1991 | Jones | 340/475 |
| 5,101,326 | 3/1992 | Roney | 362/80 |

FOREIGN PATENT DOCUMENTS

| | | | |
|---|---|---|---|
| 110403 | 5/1940 | Australia | 340/475 |
| 8200272 | 2/1982 | Australia | 362/80 |
| 1530556 | 4/1965 | Fed. Rep. of Germany | 362/61 |
| 1229764 | 3/1960 | France | 362/80 |
| 265748 | 11/1988 | Japan | 362/80 |
| 2200736 | 8/1988 | United Kingdom | 362/80 |

*Primary Examiner*—Richard R. Cole
*Assistant Examiner*—L. Heyman

[57] ABSTRACT

A motor vehicle light cluster system (Safety Light Marker System) in form of elongated light sources located along the (3) on (2) (3) of a motor vehicle and connected to the motor vehicle signaling and electrical circuit in known ways. The Safety Light Marker System is operated to provide braking, parking emergency flasher and turn indications that will be clearly visible from the side and from above a motor vehicle and which significantly improve driving safety by improving the visibility of the motor vehicle.

1 Claim, 1 Drawing Sheet

SAFETY LIGHT MARKER SYSTEM FOR MOTOR VEHICLES

BACKGROUND OF THE INVENTION

1. Field of invention

This invention relates to a motor vehicle light system and pertains more particularly to marker and safety lights for a motor vehicle.

2. Description of the Related Art

At present indicator lights systems are typically mounted at the rear or front of a motor vehicle and are intended to delineate the motor vehicle general dimensions as well as to communicate the various operational states to a person in front or behind of a motor vehicle.

More particularly typical functions for the front lights include: outlining the general dimensions of the motor vehicle; indicating left or right turn; illuminating of the road in front of a motor vehicle; emergency flashing lights. Typical functions for the back lights, on the other hand include: parking lights; backup lights; left and right turn indicator lights; brake lights; and emergency flashing lights.

These functions are produced by light fixtures mounted at the far left and far right corners of the motor vehicle usually in separate clusters, and are electrically controlled from the passenger compartment by operating levers, buttons, the brake pedal, the transmission and the like.

The rear light fixtures are sometimes arranged in elongated, continuous clusters. See for example U.S. Pat. No. 4,851,810, issued on Jul. 25, 1988 to Vitale et al. Also, at the back of automobiles, at the level of the rear window, deceleration warning lights are mounted. These lights can be shaped in elongated clusters or as one multi-function rare gas automobile indicator bulb as proposed in U.S. Pat. No. 4,682,146, issued on Jul. 21, 1987 to Friedman III. Also it had been proposed, in U.S. Pat. No. 4,751,493 issued on Jun. 14, 1988 to Miller, to retrofit automobiles with deceleration warning lights that are installed on the rear deck and supplied in an installation ready kit. Thus, all known motor vehicle safety marking and signaling light systems are located in front or at the rear end of the vehicle and are housed in small or elongated clusters and are assembled and installed by the manufacturer or can be purchased in kits for retrofit installation to existing vehicle models.

Thus, light systems are designed primarily for viewing from front or the rear of the vehicle. However, in typical traffic situations while the vehicle is passing another vehicle or is being passed it will be viewed from the side. Further, if a motor vehicle is passed by another vehicle of significantly larger vertical dimension, such as tractor trailer, it will be viewed from above. Because vehicles have lights only at the front and rear, they cannot be seen during passing or by larger vehicle and that creates hazardous situations at night or under other poor visibility conditions which leads to traffic accidents.

SUMMARY OF THE INVENTION

The main objective of this invention is to provide additional marking for a motor vehicle, such as an automobile, by providing one or more light sources located at the sides and/or at on the roof of the vehicle. It is proposed to mark the entire length of the motor vehicle by elongated light sources. This will significantly improve side on and from above visibility of the vehicle and reduce accidents caused by poor visibility.

Such light sources according to invention can be retrofitted to existing motor vehicles or can be factory installed. According to preferred embodiment these elongated light sources or clusters are installed at a level which is clearly visible from the side (for example at the level just below the side windows), from above (for example on the edges of the cars roof), and from below (for example on the side of a truck at the level of a passenger vehicle). Again according to invention these light sources will be constructed in form of elongated light clusters, or several single light sources that will clearly demarcate a motor vehicle at night or under other limited visibility driving conditions and reduce accidents caused by poor visibility. In the past motor vehicle demarcation has had the object of being seen by vehicles approaching from the front or rear and have demarcated only the width of the vehicle. A significant improvement proposed in current invention is demarcation of the length and height of a motor vehicle adding to all possible viewing positions of the vehicle.

In addition to motor vehicle demarcation elongated light sources in accordance with the invention positioned on the side and on the top of a motor vehicle will have the following signaling functions: parking lights; backup lights; left and right turn indicator lights; brake lights; emergency flashing lights.

All these functions can be achieved by connecting the Light Marker System proposed here to the corresponding electrical circuits of a motor vehicle that perform the functions identified above.

BRIEF DESCRIPTION OF THE DRAWINGS

Numerous other objects of this invention should be discerned and appreciated from specification taken in conjunction with the drawing, wherein like reference numeral refer to similar parts and illustrate implementation of the invention for different types of vehicles.

DETAILED DESCRIPTION

The invention provides an improved motor vehicle Safety Light Marker System that is comprised of light clusters, or number of single multi-function rare gas motor vehicle indicator bulbs that are installed along the side and/or on the top of a motor vehicle. These light clusters are factory installed on the tops and/or sides of a motor vehicle or retrofitted into existing motor vehicles. The lights are preferably connected to the main electrical circuit of a motor vehicle using, for example, known electrical wire systems.

Thus the main objective of this invention is to provide additional marking of a motor vehicle such as an automobile by providing one or more light sources on the sides and/or the top of the automobile. It is proposed to mark the entire length of a motor vehicle by elongated light sources that are placed over a substantial portion of the vehicle length. This will significantly improve side on and from above visibility of motor vehicle and reduce accidents caused by poor visibility.

Figure 1:
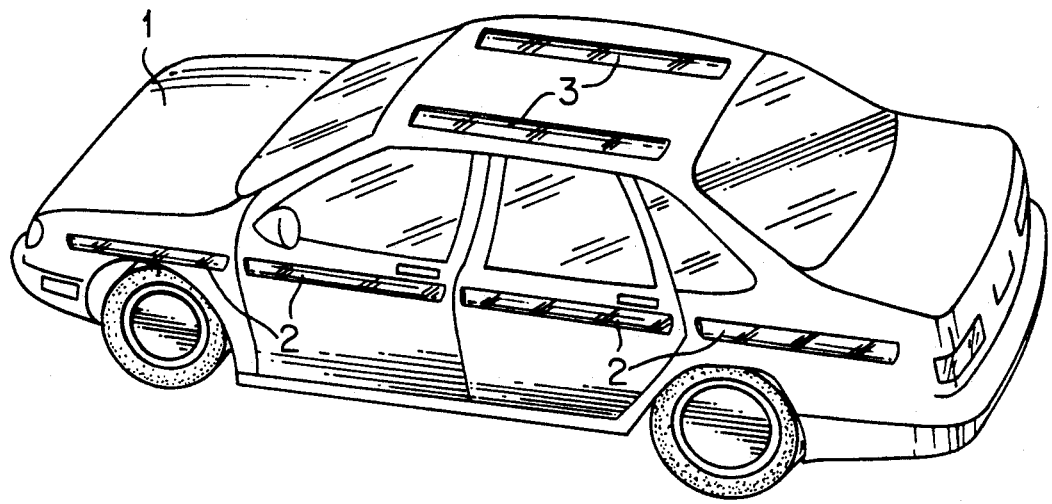
FIG. 1 is a perspective view from above of an automobile equipped with a Light Marker System in accordance with the invention.
Figure 2:
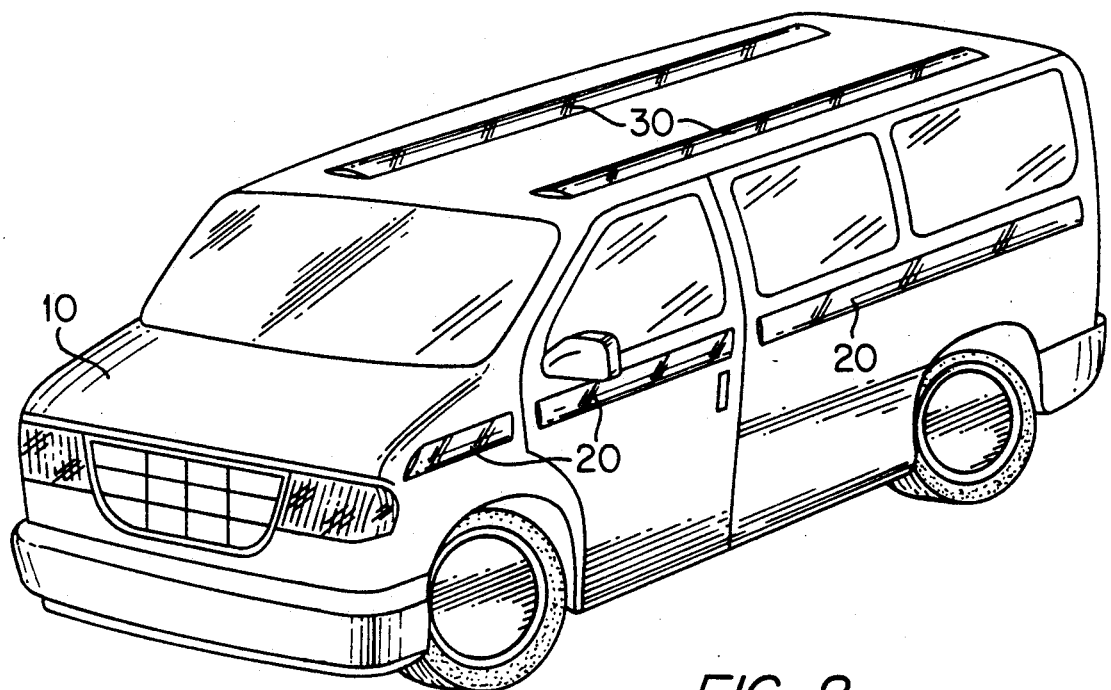
FIG. 2 is a perspective view of a van equipped with a Light Marker System in accordance with the invention.

According to preferred embodiment the elongated light sources or clusters are installed at the level clearly visible from the sides and/or from above as in FIG. 1, FIG. 2. More particularly FIG. 1 shows a view of a sedan type automobile 1 equipped with SAFETY LIGHT MARKER SYSTEM consisting of side lights 2 and roof lights 3 that are marking a substantial length of the vehicle. FIG. 2 shows a view of a van type motor vehicle 10 equipped with the side lights 20 and roof lights 30 of the SAFETY LIGHT MARKER SYSTEM that are placed over a substantial length of the vehicle. As noted above the light sources are constructed in form of elongated light clusters, the technology of production of which is well known, and/or several single light sources placed over a substantial length of the vehicle, that will clearly demarcate a motor vehicle at night or other limited visibility driving conditions and reduce accidents caused by poor visibility.

A significant improvement proposed in accordance with the present invention is demarcation of the length and height of a motor vehicle as shown in FIG. 1, FIG. 2, thereby adding to all possible viewing positions of a motor vehicle.

In addition to the motor vehicle demarcation proposed here elongated light sources and light clusters positioned at the side and at the top of the motor vehicle advantageously provide the following signaling functions: parking lights; backup lights; left and right turn indicator lights; brake lights; emergency flashing lights.

All these functions can be achieved by connecting proposed here Light Marker System to the corresponding electrical circuits of a motor vehicle that perform listed above functions using for example a system of electrical wires.

An example of a clear advantage of the proposed motor vehicle demarcation is when, during foggy conditions, a large truck is exiting from a side road to cross a main road. In this driving situation the driver of the truck exiting from the side road may not see another motor vehicle moving on the main road, at the same time the driver of the motor vehicle moving on the main road can not see the front or back lights of the long truck. It is clear that in this traffic situation an accident may be avoided if the truck crossing the road will have the SAFETY LIGHT MARKER SYSTEM in accordance with the present invention. In this case the light emitted from the light fixtures of the Light Marker System will be clearly visible to the vehicle moving on the main road, their length will delineate the size of the truck and their presence may prevent an accident.

Another typical traffic situation is driving at night on a narrow two way road. With the existing motor vehicle light systems the drivers of the cars moving towards each other can see only the head lights of the opposite motor vehicle. When one of the head lights misfunction the marker information of the incoming vehicle is cut in half and an automobile can be mistaken for a motorcycle. This can lead to accidents that are caused by misinterpretation of the traffic situation. The objective of the current invention is provide safety marker system by elongated light sources which will provide more information about vehicle dimensions to other drivers. At night when two vehicles are moving towards each other on a narrow two way road if the automobiles are equipped with the light marker system of the invention at the sides, the driver in an opposing motor vehicle will be able to determine: the oncoming vehicle dimensions; distance to the oncoming motor vehicle (can be judged by the length of the light streaks); forthcoming road small turns (can be judged by the changes in the angle of the light streaks). All this visual information will help drivers to accurately evaluate the type, size, and location of other vehicle particularly at night or other poor visibility conditions and will thus prevent accidents.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A safety light marker system for a vehicle for indicating vehicle location and signalling adjacent taller vehicles, said vehicle having an electric signalling system including a turning signal and a brake signal, said vehicle having a roof, said roof being generally polygonal having a front, a rear, a left and a right edge, the safety light marker system comprising two parallel elongated fixtures mounted on the roof substantially along the entire length thereof, said fixtures being disposed substantially parallel to the left and right side edges and displaced therefrom by a distance less than half of said width of said front and rear edges such that a first of said fixtures lies along said left edge while a second of said fixtures lies along said right edge, each of said fixtures including at least one light source adapted to provide illumination along the entire length of each of said fixtures for viewing from above so that said adjacent taller vehicles can determine, at low ambient light conditions, the location and orientation of the vehicle, said at least one light source of each of said fixtures being connected to said vehicle's said electric signalling system whereby said adjacent taller vehicles can view a turning signal and a brake signal from said light source when said signals are activated by said electric signalling system.

* * * * *